United States Patent
Emmanuel et al.

(10) Patent No.: US 10,412,687 B2
(45) Date of Patent: *Sep. 10, 2019

(54) SYSTEMS AND METHODS FOR CABLE AND WLAN COEXISTENCE

(71) Applicant: NETGEAR, INC., San Jose, CA (US)

(72) Inventors: Joseph Amalan Arul Emmanuel, Cupertino, CA (US); Peiman Amini, Mountain View, CA (US); Shahrokh Mehroziad Zardoshti, Pleasanton, CA (US)

(73) Assignee: NETGEAR, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/651,821

(22) Filed: Jul. 17, 2017

(65) Prior Publication Data

US 2018/0041970 A1 Feb. 8, 2018

Related U.S. Application Data

(63) Continuation of application No. 14/572,007, filed on Dec. 16, 2014, now Pat. No. 9,713,099.

(51) Int. Cl.
*H04L 12/28* (2006.01)
*H04W 52/24* (2009.01)
(Continued)

(52) U.S. Cl.
CPC ........ *H04W 52/243* (2013.01); *H04B 17/309* (2015.01); *H04B 17/336* (2015.01);
(Continued)

(58) Field of Classification Search
CPC .................................................... H04L 12/50
(Continued)

(56) References Cited

U.S. PATENT DOCUMENTS

| 9,332,439 B2* | 5/2016 | Chandra | ............... H04W 16/14 |
| 2002/0086641 A1* | 7/2002 | Howard | ............... H04L 1/0006 |
| | | | 455/67.11 |

(Continued)

FOREIGN PATENT DOCUMENTS

| CN | 102308611 A | 1/2012 |
| CN | 102378195 A | 3/2012 |

(Continued)

OTHER PUBLICATIONS

3GPP TR 36.816 V1.0.0, 3rd Generation Partnership Project; Technical Specification Group Radio Access Network; Evolved Universal Terrestrial Radio Access (E-UTRA); Study on signalling and procedure for interference avoidance for in-device coexistence, Nov. 2010, 34 pages.

(Continued)

*Primary Examiner* — Dang T Ton
(74) *Attorney, Agent, or Firm* — Perkins Coie LLP

(57) ABSTRACT

Various of the disclosed embodiments improve the operations of a combined access point/Cable modem. Though the access point component and the Cable modem component may perform operations in different spectrums, harmonics in the Cable spectrum may interfere with operations, e.g., in the 2.4 GHz and 5 GHz range, of the access point. Some embodiments implement a remediation and/or channel transition process for the access point following detection of Cable-related interference. During remediation, the device may, e.g., adjust the wireless power levels, EDCA backoff times, signal thresholds, etc. In some embodiments, if the remediation actions prove ineffective, the wireless peers may be relocated to a channel further from the interfering Cable harmonics. The determination to remediate or reallocate may be based on various contextual factors, e.g., the character of the peer devices and the applications being run.

27 Claims, 12 Drawing Sheets

(51) Int. Cl.
*H04B 17/309* (2015.01)
*H04B 17/345* (2015.01)
*H04B 17/336* (2015.01)
*H04W 84/12* (2009.01)
*H04W 52/36* (2009.01)

(52) U.S. Cl.
CPC ......... *H04B 17/345* (2015.01); *H04W 52/367* (2013.01); *H04W 84/12* (2013.01)

(58) Field of Classification Search
USPC .......................................................... 370/329
See application file for complete search history.

(56) References Cited

U.S. PATENT DOCUMENTS

| | | |
|---|---|---|
| 2008/0144493 A1 | 6/2008 | Yeh |
| 2011/0128849 A1* | 6/2011 | Guo .................... H04W 28/10 370/235 |
| 2011/0211468 A1 | 9/2011 | Zhang et al. |
| 2012/0176923 A1 | 7/2012 | Hsu et al. |
| 2014/0031036 A1 | 1/2014 | Koo et al. |
| 2014/0064301 A1 | 3/2014 | Rison |
| 2014/0286203 A1 | 9/2014 | Jindal et al. |
| 2015/0036514 A1 | 2/2015 | Zhu et al. |
| 2015/0043338 A1 | 2/2015 | Yi et al. |
| 2015/0094114 A1 | 4/2015 | Rao et al. |
| 2015/0105067 A1 | 4/2015 | Valliappan et al. |
| 2015/0245365 A1 | 8/2015 | Isokangas et al. |
| 2016/0021586 A1 | 1/2016 | Akhi et al. |
| 2016/0100430 A1 | 4/2016 | Dabeer et al. |

FOREIGN PATENT DOCUMENTS

| | | |
|---|---|---|
| CN | 102480774 A | 5/2012 |
| CN | 102484805 A | 5/2012 |
| CN | 102714799 A | 10/2012 |
| CN | 103228052 A | 7/2013 |
| CN | 103250457 A | 8/2013 |
| CN | 103270804 A | 8/2013 |
| CN | 103874072 A | 6/2014 |
| WO | 2014047894 A1 | 4/2014 |

OTHER PUBLICATIONS

IEEE Std 802.11h™-2003, Part 11: Wireless LAN Medium Access Control (MAC) and Physical Layer (PHY) specifications, Amendment 5: Spectrum and Transmit Power Management Extensions in the 5GHz band in Europe; IEEE Computer Society, The Institute of Electroni, Oct. 14, 2003, pp. 1-59.

"Problem Scenarios and Proposed Solutions for Home BS Coexistence", 3GPP TSG-RAN WG4 Meeting # R2-106200, Agenda Item 7.9.1, Jacksonville, USA, Nov. 2010, 5 pages.

* cited by examiner

FIG. 5

| HRC | 8th Harmonics | 9th Harmonics | 5GHz WiFi Channel Info | |
|---|---|---|---|---|
| 613,750,000 | 4,910,000,000 | 5,523,750,000 | Ch 36 | 5180 |
| 619,750,000 | 4,958,000,000 | 5,577,750,000 | Ch 40 | 5200 |
| 625,750,000 | 5,006,000,000 | 5,631,750,000 | Ch 44 | 5220 |
| 631,750,000 | 5,054,000,000 | 5,685,750,000 | Ch 48 | 5240 |
| 637,750,000 | 5,102,000,000 | 5,739,750,000 | Ch 149 | 5745 |
| 643,750,000 | 5,150,000,000 | 5,793,750,000 | Ch 153 | 5765 |
| 649,750,000 | 5,198,000,000 | 5,847,750,000 | Ch 157 | 5785 |
| 655,750,000 | 5,246,000,000 | 5,901,750,000 | Ch 161 | 5805 |

| STD | 8th Harmonics | 9th Harmonics | 5GHz WiFi Channel Info | |
|---|---|---|---|---|
| 615,000,000 | 4,920,000,000 | 5,535,000,000 | Ch 36 | 5180 |
| 621,000,000 | 4,968,000,000 | 5,589,000,000 | Ch 40 | 5200 |
| 627,000,000 | 5,016,000,000 | 5,643,000,000 | Ch 44 | 5220 |
| 633,000,000 | 5,064,000,000 | 5,697,000,000 | Ch 48 | 5240 |
| 639,000,000 | 5,112,000,000 | 5,751,000,000 | Ch 149 | 5745 |
| 645,000,000 | 5,160,000,000 | 5,805,000,000 | Ch 153 | 5765 |
| 651,000,000 | 5,208,000,000 | 5,859,000,000 | Ch 157 | 5785 |
| 657,000,000 | 5,256,000,000 | 5,913,000,000 | Ch 161 | 5805 |

*FIG. 6*

SYSTEMS AND METHODS FOR CABLE AND WLAN COEXISTENCE

CROSS-REFERENCE TO RELATED APPLICATION

This application is a continuation of U.S. patent application Ser. No. 14/572,007, filed Dec. 16, 2014, which application is incorporated herein in its entirety by this reference thereto.

TECHNICAL FIELD

The disclosed embodiments relate to systems and methods for communication coexistence.

BACKGROUND

Many users would prefer that their network devices be versatile and compact in their functionality. Thus, Cable modems are often provided with Cable interface connections, but also with local wireless access, e.g., via a WLAN Access Point. In this manner, the user may receive Internet access, television, and other services along their Cable connection. They can place the single Cable modem at one location in their home or office and interface their remaining wireless and Cable devices through the single, compact interface.

Unfortunately, the dual presence of Cable and WLAN devices in a single device can result in suboptimal wireless performance. Cable signals present either within the Cable modem or in wires leading to/from the modem can operate at frequencies having harmonics that may degrade wireless performance. Thus, users are often forced to purchase a separate access point which they connect with the Cable modem at a location with less interference. The Cable modem is consequently less versatile and fails to provide the unified functionality the user desired. Such redundant purchasing of wireless capability by the user often diminishes the user's valuation of the dual wireless modem.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 5 is a table of the Cable Interference experienced at a 5 G Radio during experimentation;

FIG. 6 is a table of the Cable Interference experienced at a 5 G Radio during experimentation;

Figure 1:
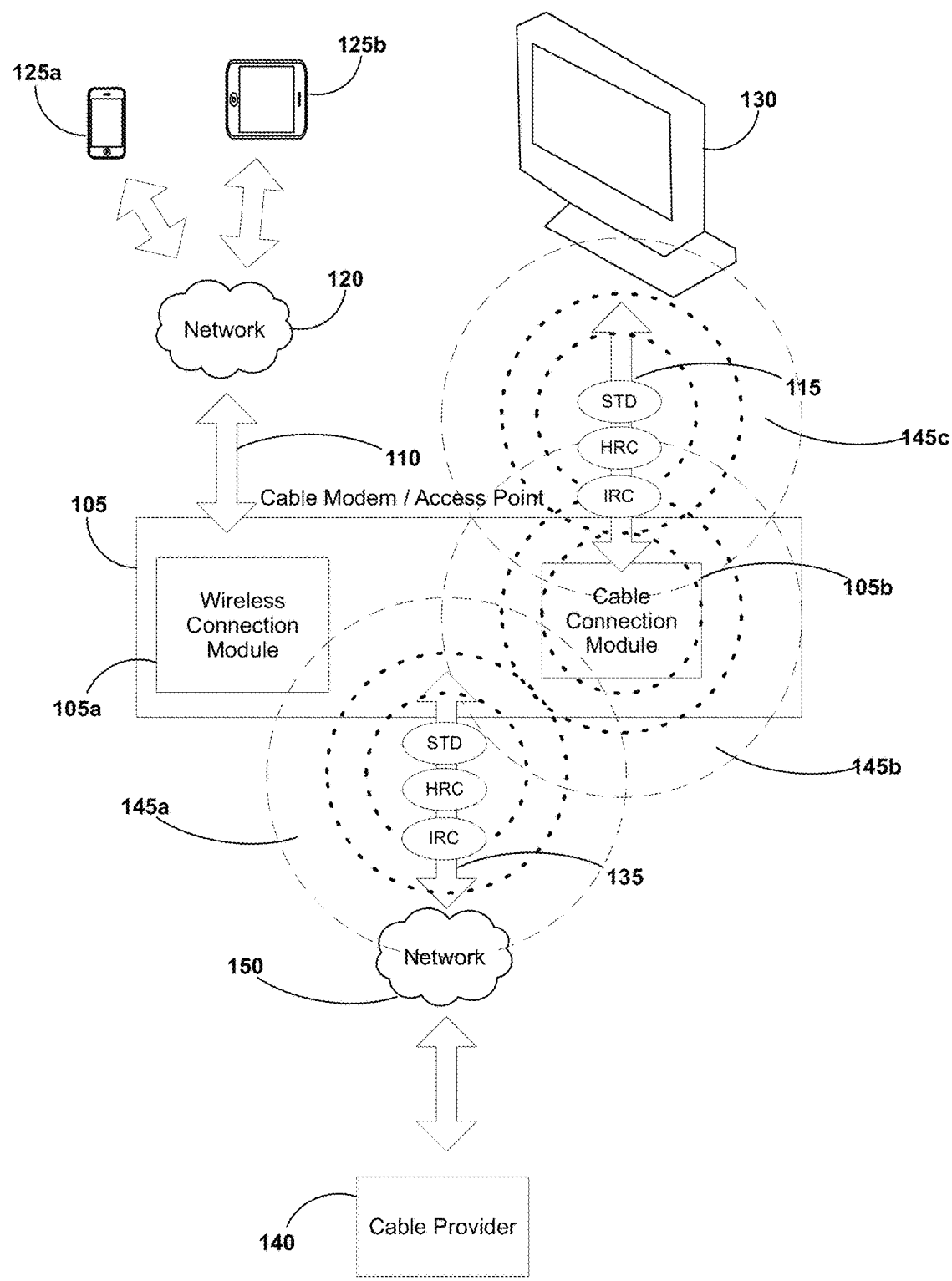
FIG. 1 is a block diagram illustrating an example instance of Cable and wireless interference as may occur in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Various of the disclosed embodiments improve the operations of a combined Access Point (AP)/Cable modem. Though the AP component and the Cable modem component may perform operations in different spectrums, harmonics in the Cable spectrum may interfere with operations, e.g., in the 2.4 GHz and 5 GHz range, of the access point. Some embodiments implement a remediation and/or channel transition process for the access point following detection of Cable-related interference. During remediation, the device may, e.g., adjust the wireless power levels, EDCA backoff times, signal thresholds, etc. In some embodiments, if the remediation actions prove ineffective, the wireless peers may be relocated to a channel further from the interfering Cable harmonics. The determination to remediate or reallocate may be based on various contextual factors, e.g., the character of the peer devices, the available bandwidth, and the applications being run.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Use Case

A wireless LAN AP operating in 2.4 GHz or 5 GHz may experience in-band interference as a result of harmonics or internodes from a Cable modem when operating in close proximity (e.g., as a single device). FIG. 1 is a block diagram illustrating an example instance of Cable and wireless interference at a dual Cable modem/access point 105 as may occur in some embodiments. The dual Cable modem/access point 105 may include a wireless connection module 105a (e.g., a WLAN Access Point) and a Cable connection module 105b (e.g., a Cable interface). The Cable connection module 105b may provide data connection, television and other services to various local devices 130 across a connection 115 which may be wired or wireless. The wireless connection module 105a may provide wireless services across connection 110 to devices 125a, 125b, e.g., wireless connection module 105a may serve as an AP in a WiFi™ network 120. The wireless services may include, e.g. Internet access, the creation of a local infrastructure, and/or peer-to-peer management.

A Cable provider 110 may provide services to the dual Cable modem/access point 105 across a network 150. Both a local connection 135 carrying Cable data, Cable connections emanating from the device 105, and the operations of the Cable connection module 105b may generate interferences 145a, 145b, 145c. The Cable connection module 105b may support different versions of the Data Over Cable Service Interface Specification (DOCSIS) including DOCSIS 1.0, 1.1, 2.0, 3.0, 3.1 or future versions, or others standards, for example standards that support NTSC channel operation, using standard (STD), Harmonic Related Carrier (HRC), or Incremental Related Carrier (IRC) frequency plans conforming to EIA-S542. Each of these signals may generate harmonics having an effect on the WLAN operation. The WLAN component 105a may not be aware of which features are provided via the Cable connection and so may need to infer the existence of interfering harmonics. In some embodiments, however, the Cable connection module 105b may inform the wireless connection module 105a of the operations being performed and the wireless connection module 105a may identify the interfering harmonics that may result.

Figure 2:
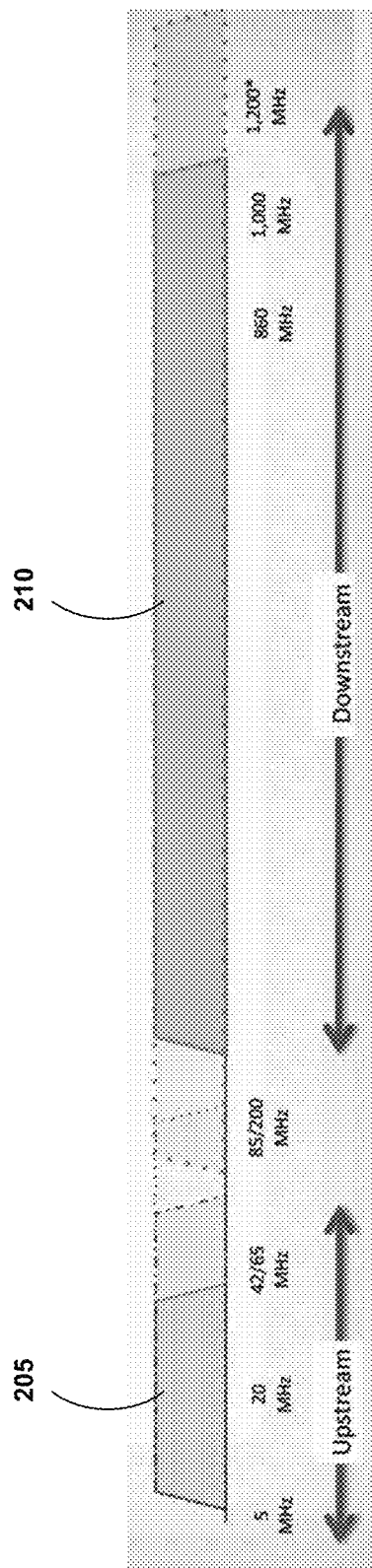
FIG. 2 is a block diagram illustrating the channel topology as may apply in some embodiments.

Data on the Cable channels may travel both up and downstream. Upstream data may travel, e.g. between the 5 to 42 MHz frequencies. In some embodiments, the Cable device may be designed to provide downstream data flows as high as 1 GHz, 1.2 GHz, or 1.7 GH. Upstream data flow may be as high as 85 MHz, 200 MHz, or 400 MHz. FIG. 2 is a block diagram illustrating the channel topology as may apply in some embodiments. As depicted in FIG. 2 the Cable device may be designed to provide downstream data flows 210 generally between 50 MHz to as high as 860 MHz while upstream communications 205 may operate at less than 50 MHz. Channel spacing in North America is 6 MHz. Due to interference from Cable frequency harmonics and internodes, the wireless connection module 105a may transmit less or stop transmitting. The interference may raise the energy levels in the wireless spectrum such that a WLAN AP will not transmit or a WLAN receiver will be unable to receive a clear signal. This may result in lost packets and in the receiver's sensitivity to the desired signal range degrading over time (an effect referred to as "desensing").

To mitigate this behavior, various embodiments contemplate having the wireless connection module 105a manage the network, possibly avoiding the use of channels experiencing considerable degradation, or otherwise modifying its behavior in a triage-like pattern.

Cable Modem Channel Recognition

If the wireless connection module 105a knows which channels the Cable model uses for uplink and downlink, it may take actions to avoid the potential harmonics, or to mitigate the effect of the harmonics, from the downlink or uplink Cable signal. If the WLAN AP and Cable modem are integrated into the same unit, the wireless LAN software may query the Cable modem directly, to determine the Cable channel. Conversely, if Cable modem and AP are two separate units, then a communication circuit in the wireless connection module 105a may automatically anticipate the harmonic interference (e.g., via preliminary channel energy measurements). In some embodiments, an Ethernet connection between the Cable modem and wireless LAN AP, e.g., may signal Cable activity using an Ethernet connection. Standard APIs may be defined for a WLAN AP and a cable modem which are connected to each other using Ethernet or another connection, such that the WLAN AP or router can query the channel of the cable modem and use this information for channel selection Upon determining the Cable model channels in operation, the wireless connection module 105a may avoid using WLAN channels with potential harmonics corresponding to the Cable model channels. For example, the wireless connection module 105a may check for harmonic interference and if the harmonics' energy is above a predefined threshold, the wireless connection module 105a may elect another channel for communication with its wireless peers.

2.4 G Harmonics

In some embodiments, for frequencies at or near 2.4 GHz the system may first monitor the following harmonics arising from the downstream Cable channel to verify that they are not encumbered by interference: 4th harmonics of channels between 601 MHz to 623 MHz and 3rd harmonics of channels between 800 MHz to 831 MHz. Other harmonics resulting from downstream or upstream Cable communications may be checked as well. If the harmonics power is above a threshold the channels may be avoided. These determinations may be performed upon startup of the system and/or periodically thereafter. Alternatively the WLAN receiver may measure the degradation resulting from the major harmonics by switching to those channels and deciding if the channels are usable. Similar operations may be performed in the 5 G range in some embodiments.

Experimental Results

Figure 3:
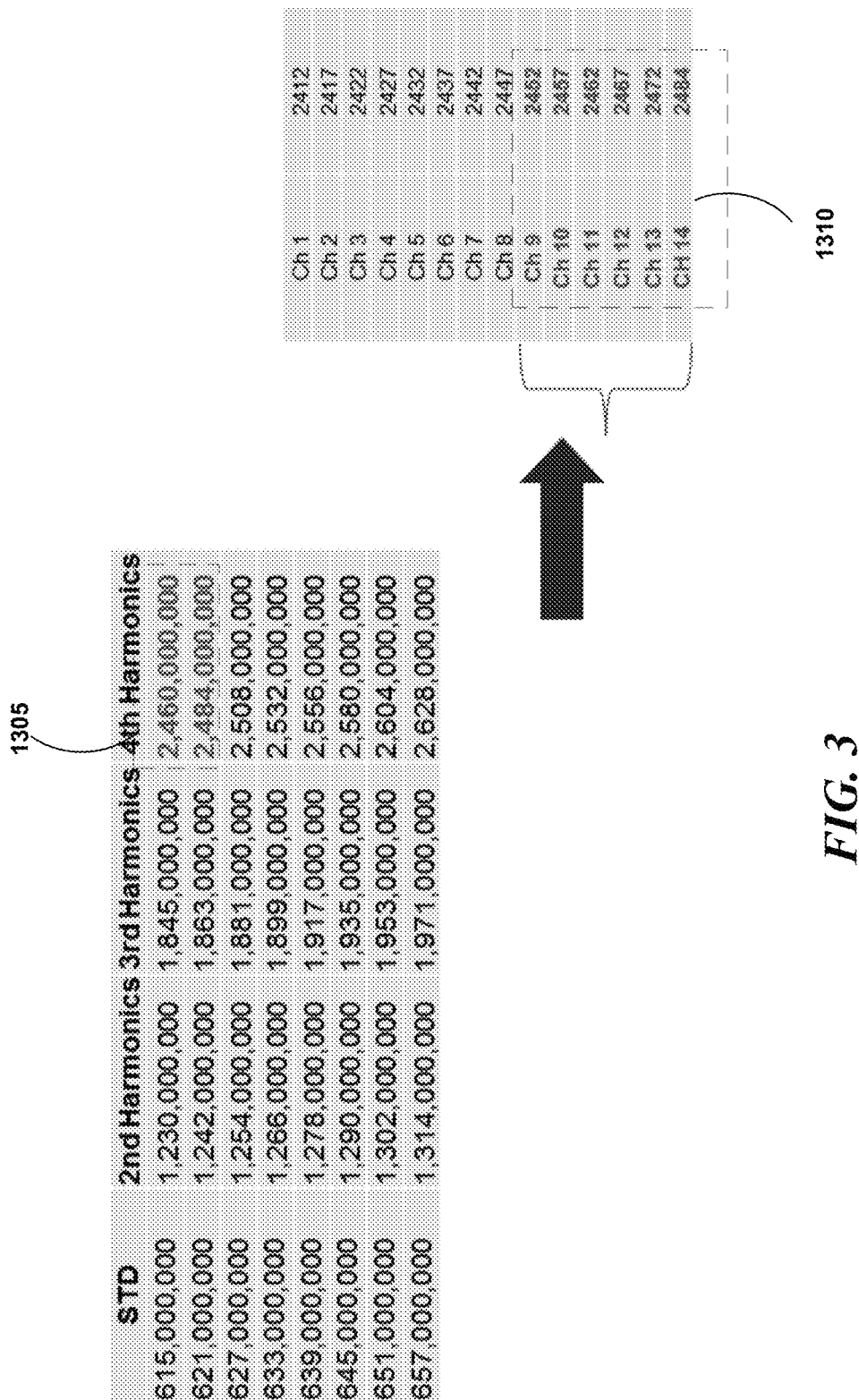
FIG. 3 is a table of the harmonically related carriers (HRC) Cable modem termination system (CMTS) Interference to 2.4 G Radio experienced during experimentation.
Figure 4:
FIG. 4 is a table of the Standard (STD) CMTS Interference to 2.4 G Radio experienced during experimentation.
Figure 7:
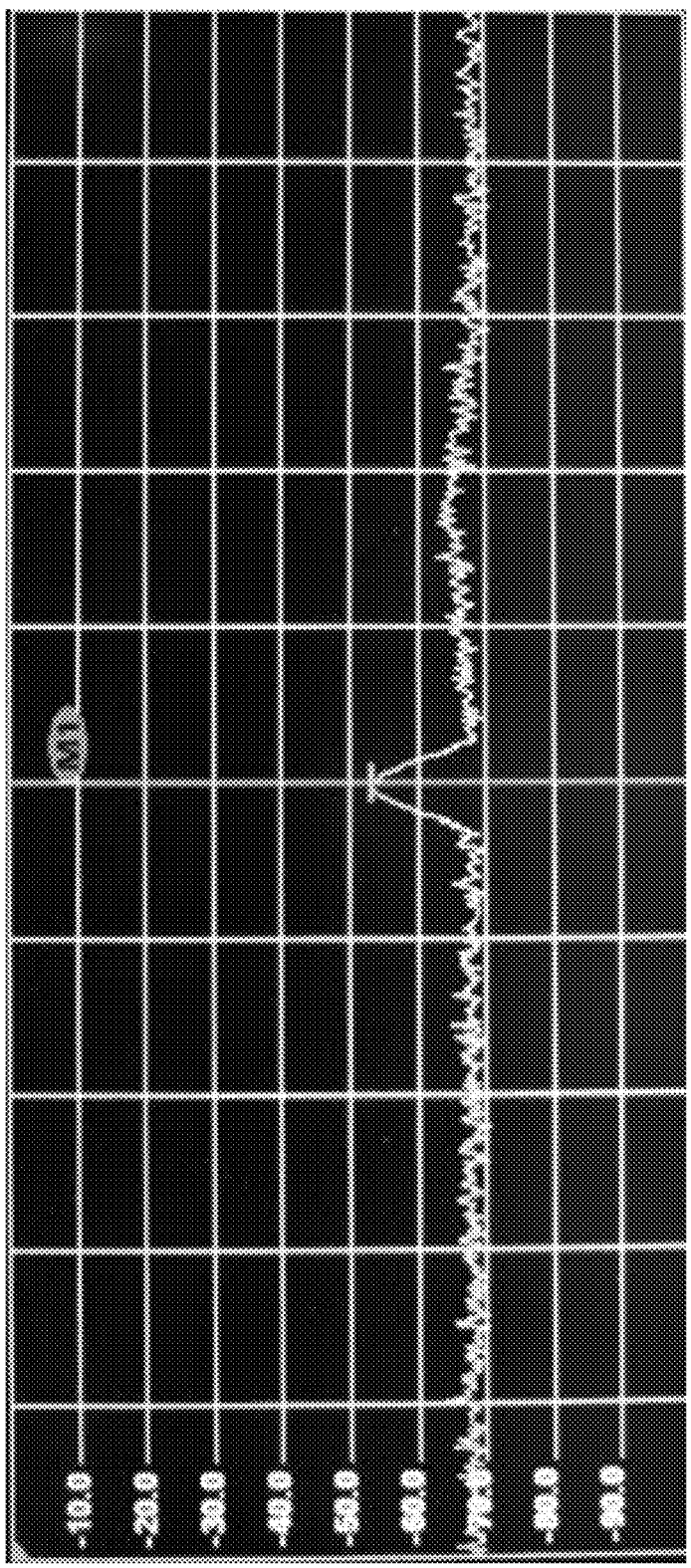
FIG. 7 is a plot of the Cable Interference experienced at a WNDR3800 Radio during experimentation.

FIG. 3 is a table of the HRC CMTS Interference experienced at a 2.4 GHz radio during experimentation. As illustrated, two of the HRC CMTS downlink channels were determined to create 4th harmonics 1305 interfering with channels 9-14 1310 of 2.4 GHz Wi-Fi operation. In some embodiments, the Access Point will select the cleanest channel (e.g., with the lowest signal energy attributable to interference) that does not overlap with the harmonics signal. FIG. 4 is a table of the STD CMTS Interference for a 2.4 G Radio experienced during experimentation. Two of the STD CMTS downlink channels 405 create interference for the channels 410 of the 2.4 GHz band. FIG. 5 is a table of the Cable Interference experienced at a 5 G Radio during experimentation. Channels 510 were all affected by 8th and 9th harmonics 505 of the downstream signal. FIG. 6 is a table of the Cable Interference experienced at a 5 G Radio during experimentation. Channels 610 were affected by 8th and 9th harmonics 605 of the downstream signal. FIG. 7 is a plot of the Cable Interference experienced at a WNDR3800 Radio during experimentation.

Experiments were also performed with a WNDR3800 wireless router provided by NETGEAR®. When a Cable Modem uses a frequency between 613.75 MHz to 657 MHz for video signals, 4th Harmonics were identified within the 2.4 GHz band higher channels. In the 2.4 GHz range, Channels 8 through 14 were also affected by 600 MHz 4th Harmonics interference.

Various embodiments consider modem systems which anticipate interference in the channels indicated above. For example, the systems may preferentially scan these channels for interference energy levels prior to selecting them, or neighboring frequencies, for WLAN communication.

Corrective Action

Figure 8:
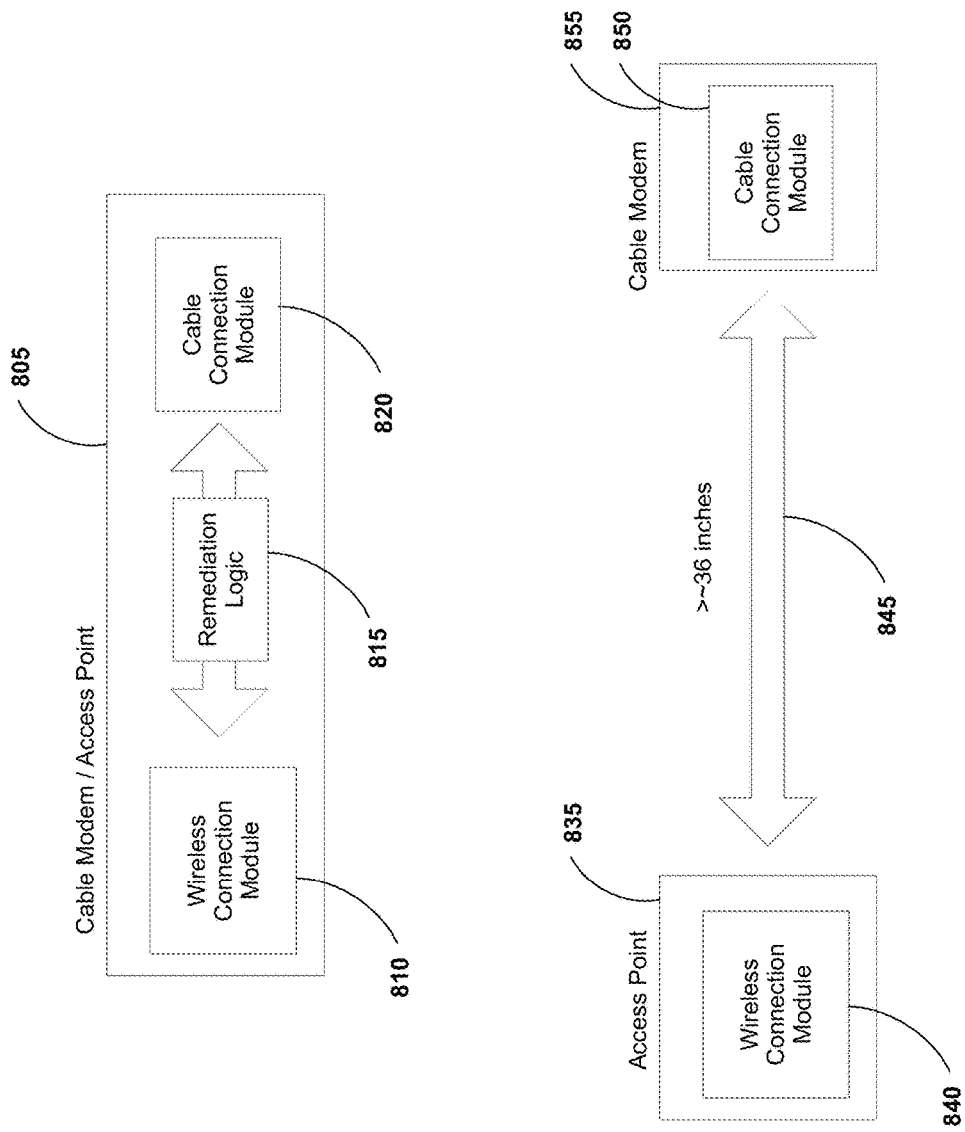
FIG. 8 is a block diagram illustrating possible corrective topologies applied in some embodiments.

FIG. 8 is a block diagram illustrating possible corrective topologies applied in some embodiments. In a dual Cable modem/access point 805 containing both a WLAN component 810 and Cable connection component 820 in close proximity, remediation logic 815 may be applied to manage operations at each of the components 810 and 820. The remediation logic 815 may indicate suitable channels to the WLAN component 810 based upon the operations at the connection component 820. Some of these operations are reflected in FIG. 9.

Alternatively, in some embodiments the Cable modem 855 containing a Cable connection module 850 may be placed at least 36 inches 845 away from the WLAN device 835 (e.g., a WNDR3800 wireless router) having wireless connection module 840 to mitigate interference.

Adaptation Process

Figure 9:
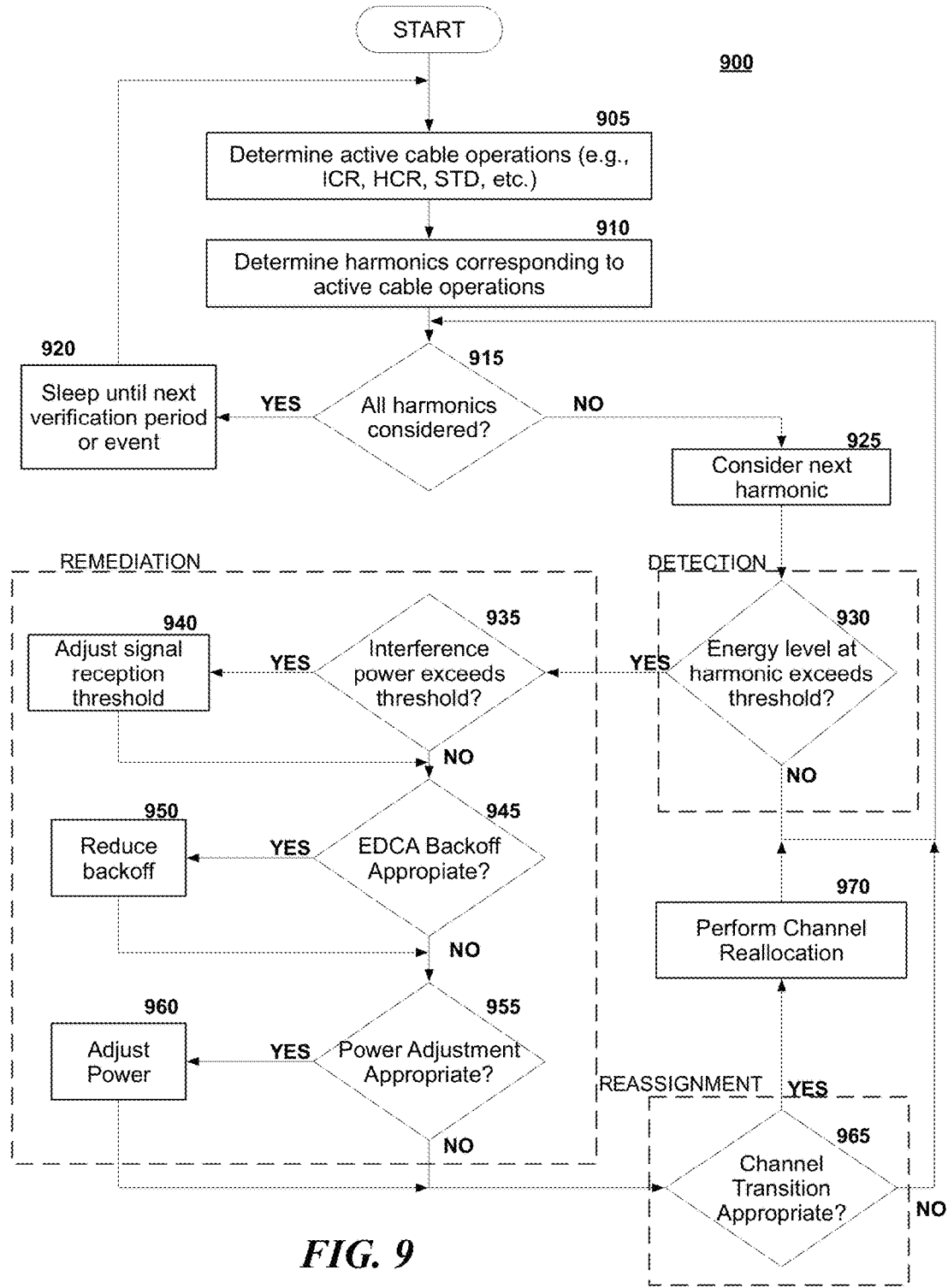
FIG. 9 is a flow diagram illustrating an adaptation process as may be implemented in some embodiments.

FIG. 9 is a flow diagram illustrating an adaptation process 900 as may be implemented in some embodiments. The process 900 may be run, e.g., by remediation logic 815 on a dual Cable modem/access point 805. At block 905 the system may determine what Cable operations are active at a Cable device, e.g., Cable connection module 820. At block 910, the system may determine the harmonics corresponding to the operations (e.g., the harmonics identified in FIGS. 3-6). For example, if the Cable modem component has identified the channels or operations it is using to the system, the system may identify the relevant resultant harmonics in a look-up table.

At block 915, the system may determine if all the relevant harmonics have been considered. If so, the system may sleep at block 920 or wait until an event triggers (e.g., the usage of a new wireless channel, a signal from the cable connection module, etc.) the reassessment of possible Cable-related interference. For example, the Cable connection module 850 may inform the logic when a new operation is being performed. This "event" may trigger a reassessment. Similarly, operations at the WLAN side, such as the addition of a new client device to a group, or a request to transition to a new channel may constitute events triggering a reassessment.

The buildup of software queues and hardware queues in the WLAN module may also be a trigger for reevaluating the situation. The number of beacons transmitted in a second is another trigger which may be taken into account. On most APs, ten beacons per second are transmitted per SSID. If the AP can not access the channel to send the expected number of beacons, e.g. ten beacons, this may be an indication that there is cable or other types of interference and, as a result, the number of transmitted beacons may be used as a trigger.

Where harmonics remain for consideration, at block 925, the system may consider the next relevant harmonic. During a detection period at block 930, the system may determine whether the energy levels attributable to a Cable operation harmonic exceed a given threshold in a wireless channel. The threshold may be both of time and energy, to reflect that the interference is a consistent phenomenon. In this manner, transitory interference may not result in a decision to avoid a channel associated with the harmonic. In some embodiments, the counters from WLAN physical layer and MAC layer may be used to measure the severity and influence of interference. If the WLAN PHY module misdetects a packet preamble on interference more than X per second, then this could be used as an indication that there is excessive interference.

If the MAC level counters show that the medium is busy more than Y percent of the time that the WLAN module is not transmitting or receiving WLAN packets, then this is an indication that there may be interference from the WLAN module. To elaborate, WLAN layer 2 can measure the percentage of the time where there is WLAN activity. When there is no WLAN activity, if there is no non-WLAN interference the medium is available for usage; but if there is non-WLAN interference, such as cable harmonic interference above an energy detection threshold, the medium may not be used. Therefore, the duration of the time when there is non-WLAN interference which results in backing off can be used as a measure of the severity of interference.

Blocks 935-960 reflect various remediation steps which may mitigate the adverse effect of the interference. At block 935, the system may determine whether the interference power exceeds a second threshold and/or the MAC and PHY parameter pass a second threshold. The second threshold may be designed to determine if filtering adjustments may suffice to avoid the interference. If so, at block 940 the system may adjust a signal reception threshold and/or filter and may request the same or similar adjustment at a peer device. At block 945, the system may determine whether adjustment to the EDCA backoff parameters, energy detect threshold, packet detection threshold, or other thresholds may suffice to mitigate the effects of the harmonic interference. If such adjustments are expected to mitigate the interference, at block 950, the system may adjust the backoff interval or other parameters. At block 955, the system may determine if a receiving antenna or a transmitting antenna power level may be adjusted to overcome the interference. At block 960, for example, the system may direct a peer device to increase both its transmission and reception power commensurately with changes at its own.

At block 965, the system may reassess the channel quality following one or more of the remediation steps as well as consider the consequences of any future planned remediation. If remediation has failed to achieve the desired improvements, future remediation will prove unacceptably detrimental, and/or a suitable alternative channel is available, than at block 970, the system may perform a channel reallocation, moving one or more client devices to a new channel with less interference (e.g., a channel identified in FIGS. 3-6 not expected to encounter harmonic effects).

Figure 10:
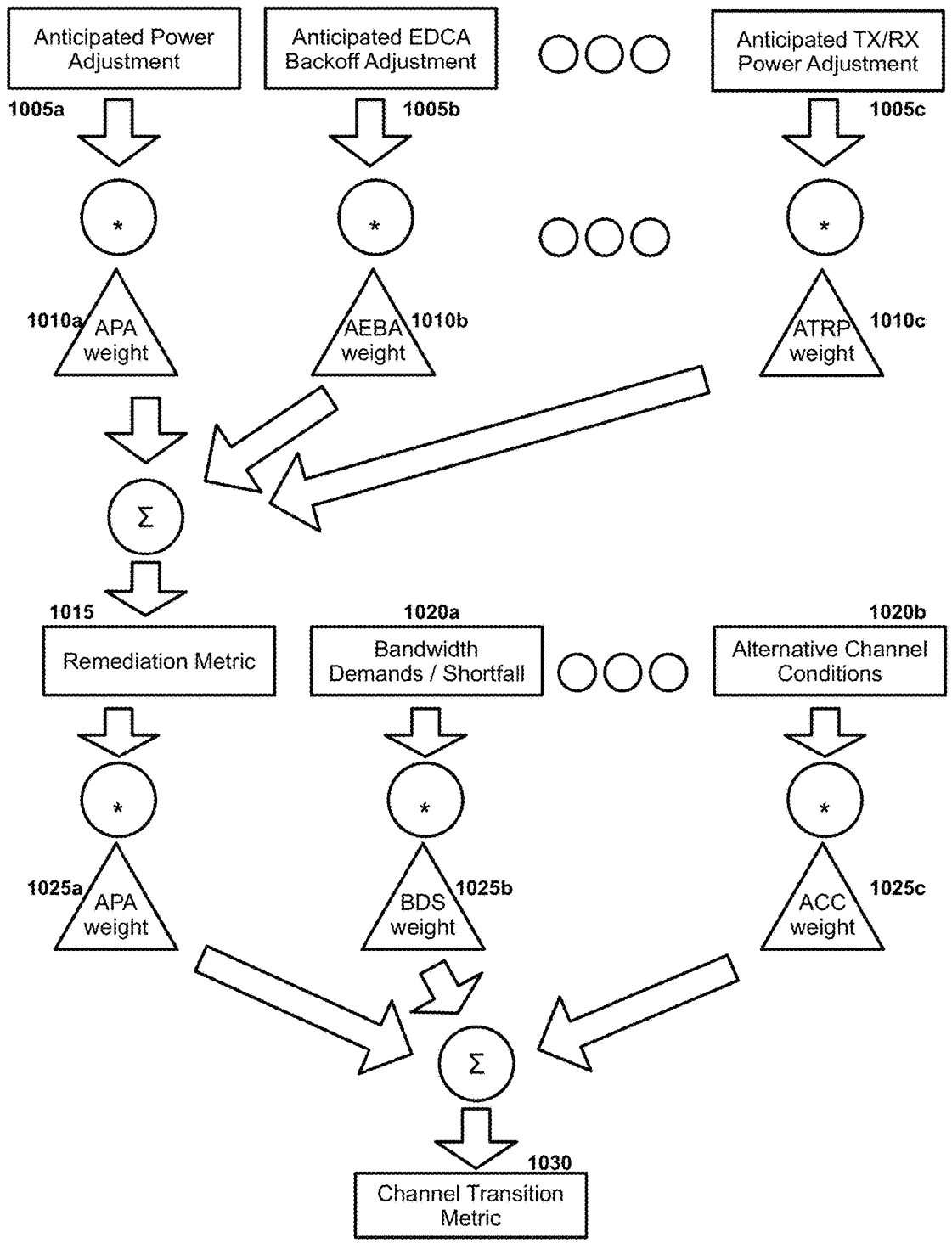
FIG. 10 is a block diagram illustrating a cascaded weight-based factor assessment for generating a remediation and channel transition metric as may be implemented in some embodiments.

FIG. 10 is a block diagram illustrating an example cascaded weight-based factor assessment for generating a remediation 1015 and channel transition metrics 1030 as may be implemented in some embodiments. As indicated, a remediation metric 1015 may be generated as a weighted sum of various remediation factors, such as an anticipated power adjustment 1005a, EDCA backoff 1005b, TX/RX power adjustment 1005c, etc. These factors may reflect the planned adjustments in the next iteration of remediation if the coexistence continues to mitigate desired levels of communication. These factors may be normalized by their corresponding weights 1010a, 1010b, 1010c so that their effects on communication may be assessed. Thus, the remediation metric 1015 may be used to determine whether additional, future remediation is suitable given the current impact on channel quality.

A channel transition metric 1030 may also be generated by taking a weighted sum of the remediation metric 1015 with other channel condition factors, e.g., the quality of alternative channels 1020b, the difference between the desired bandwidth for applications and that which is presently possible with the coexistence 1020a, etc. with various scaling factors 1025a, 1025b, 1025c. The system may elect to initiate a channel transition based upon the channel transition metric's relation to a threshold. Though depicted as sums of weighted values in this example, one will recognize that business rules may also determine whether remediation is performed or channel transitions are made.

Channel Reallocation

Various embodiments consider extending channel switch announcement between bands so that users can be moved, e.g., from 2.4 G to 5 GHz channels or other bands which experience less coexistence complications—in this manner following a coexistence interference determination as discussed herein appropriate corrective action may be taken. The specification may be modified, e.g., by extending channel announcement messages such that they can be addressed by only one client or a subset of clients, instead of moving all clients connected with an access point. Based on the percentage of time that interference is active, the power of the interfering signal, and the traffic requirement of the Wi-Fi clients that are associated to the AP, the AP decides which clients can stay in the band that has interference and which clients need to be moved to other bands. The AP sends a packet to direct the clients that need to be moved away to the band they need to be moved to. Various embodiments contemplate a combination of smart channel selection of Wi-Fi access points (APs), transmit power control on APs and/or at client devices, messaging between AP and clients for Wi-Fi power control, smart receiver adjustment on Wi-Fi, and adding signaling such that traffic can be offloaded to Wi-Fi when possible.

The channel switch announcement element which is defined in section 8.4.2.18 in IEEE 802.11REVmb document may be modified to optionally add client MAC addressed or client association ID (AID)s for clients which need to be moved from one band on an AP to another band on the same AP. For example clients that need to move from 2.4 G radio to 5 G radio. Alternatively a new switch announcement element may be defined which is specifically targeted to moving clients from one radio on an AP to another radio. The switch announcement which could be used for APs that have two radios on two bands, three radios on three bands, or more. The channel switch announcement may be done by adding the announcement element to a beacon, it can be done by sending an action frame to each client that need to be moved, or it can be done using sending a multicast or broadcast packets to several clients that need to be moved.

The channel switch is done in a way to have seamless switch and minimized any disconnect time. This is done by giving client sometime before switching the channel and also by taking into account what type of traffic the client is having when the decision is made to switch. For example if client is receiving a VoIP call and the call can be maintained on the current channel, the switch may be postponed until the VoIP call is done. But if the client is doing a file transfer the switch can be performed without the client noticing. If the client is having a VoIP call and switch is necessary, the switch may be tried the best time possible for example, the switch may be done in the silence period of the call when nobody is talking.

Figure 11:
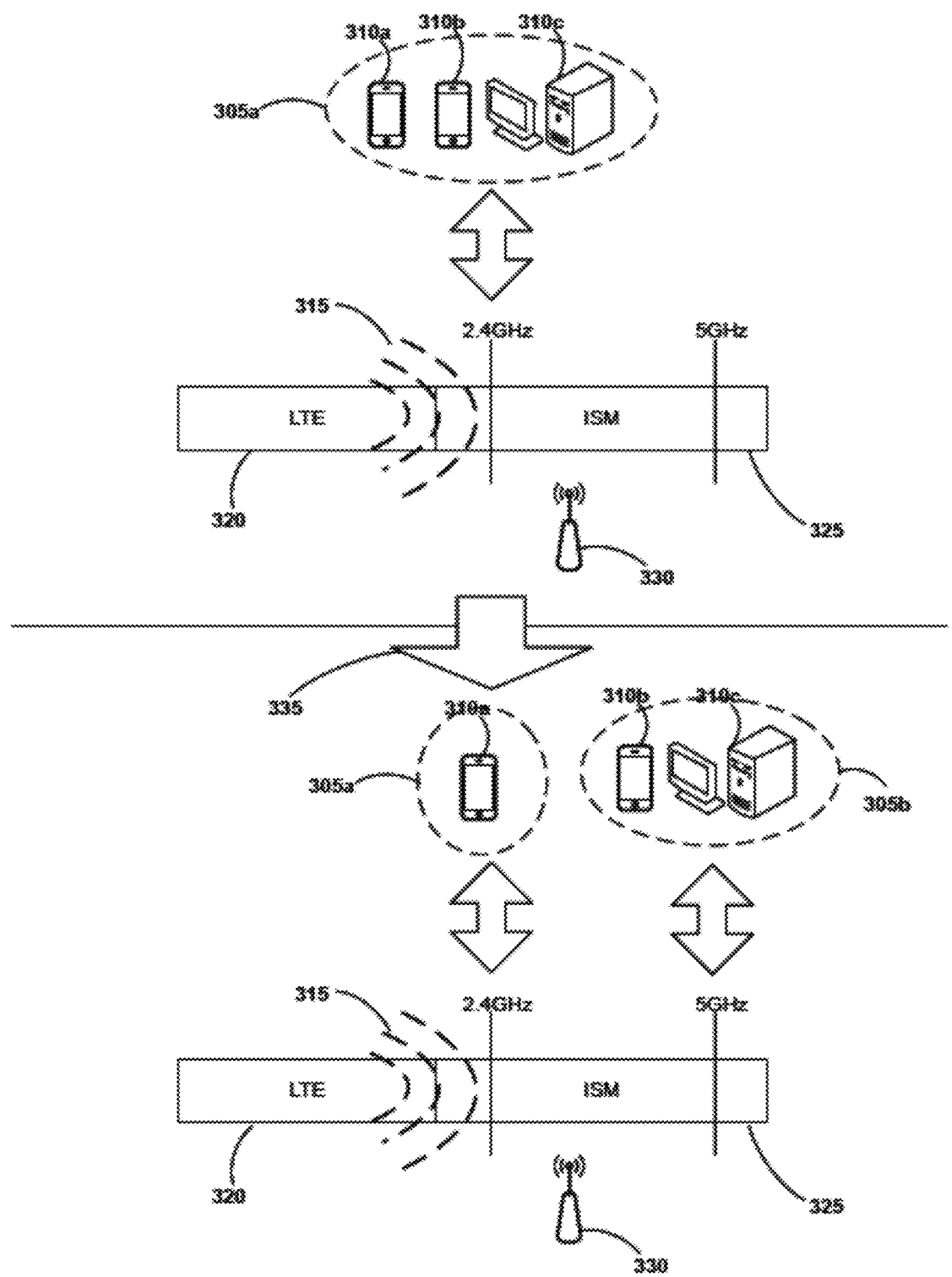
FIG. 11 is a block diagram illustrating an example channel reassignment as may occur in some embodiments.

FIG. 11 is a block diagram illustrating an example channel reassignment as may occur in some embodiments. Initially a plurality of wireless devices 310a, 310b, 310c may be in communication with an access point 330 on a 2.4 GHz channel 305a of an ISM band 325. Interference 315 from a neighboring band 320 may cause these communications to increasingly degrade. Access point 330 and/or devices 310a, 310b, 310c may detect this interference and propose a channel transition away from the band 320.

The AP 330 and devices 310a, 310b, 310c may collectively or unilaterally decided to transition 335 to a new band. In this example, some of the devices (devices 310b, 310c) have elected to communicate with the AP 330 on a 5 GHz channel 305b. In some embodiments, the AP 330 may detect the interfering activity and select a channel that is spaced further from the source of interference. For example, a higher part of 2.4 G band may be chosen when band 40 detected. Devices 310a, 310b, 310c may send feedback to an AP about interfering activity triggering WLAN channel change. The AP may retain at least one device (e.g., device 310a) on the channel to determine if the coexistence issues decrease over time. If the coexistence interference stabilizes at an acceptable level the devices may be returned to their original configuration.

However, if all APs and devices in a region engage in this behavior it may simply result in more WLAN APs and/or their devices clustering onto the same channels. This may further reduce WLAN performance. To have a seamless channel switch at the AP, it may be preferable for clients to support Channel Switch Announcements (CSA) as defined in IEEE 802.11h or the modified version of channel disclosed herein. However, some clients may not support our proposed CSA in 2.4 G band. To facilitate the dynamic change of channel, the regulatory bodies and Wi-Fi Alliance (WFA) (or a proprietary protocol among devices) may mandate the channel switch announcement (CSA) support, on WLAN APs and clients. The standard may also be modified to move the signal away from the 2.4 GHz WLAN band when possible to mitigate interference. Accordingly, various embodiments temper and complement channel transitions using other factors discussed herein. However, modification of the standards may not be pragmatic given the diversity if interests in the industry, and so various embodiments instead implement a factor-based triage-like determination of how best to handle coexistence artifacts.

Extending Channel Switch Protocols

Some embodiments propose the use of an extended channel switch announcement element and/or extended channel switch announcement used in beacon and other frames to cover switches between two different bands (example 2.4 GHz and 5 GHz, 2.4 GHz and sub1 G, 5 GHz and 60 GHz).

A Channel Switch Announcement frame which uses the Action frame may be extended to cover switching between different bands as discussed above. A channel switch mechanism may be targeted to a single client or group of clients. The client MAC Address or AID may be used to specify the clients in a beacon or action frame.

In some embodiments, if the AP recognizes that the software or hardware queues are building up for a client, or sees that a delay requirement is not being satisfied for a client, the AP may make the decision to move the client from one band to another band.

In some embodiments, the AP may perform deep packet inspection (DPI) to determine the type of traffic. Based on the DPI results for each client packet, the AP may decide which client to keep on each band and which client to move. For example, the AP may recognize a large file download via DPI when the band is busy and subject to LTE interference. The AP may decide to move the download to another band as a download is not timing critical requires considerable bandwidth. Conversely, the AP may recognize via DPI that a person is playing an interactive run and shoot game which does not require much bandwidth, but does require minimal delay. Since an increase in delay may not be tolerated, the AP may decide to keep the client on the same channel for the time being.

WLAN Channel Switching

If all the receiver and transmitter mitigations fail to bring the link quality up to any of the associated clients, the AP may choose to change the channel of the radio which is facing the coexistence issue. When the channel change happens, the AP takes into account the LTE coexistence when it picks the new channels. The AP may ask other clients for feedback on LTE interference on all channels on the bands upon which the radios operated before it issues the channel switch. The LTE interference feedback may be used in addition to the other statistic that the AP collects to pick the best channel.

Computer System

Figure 12:
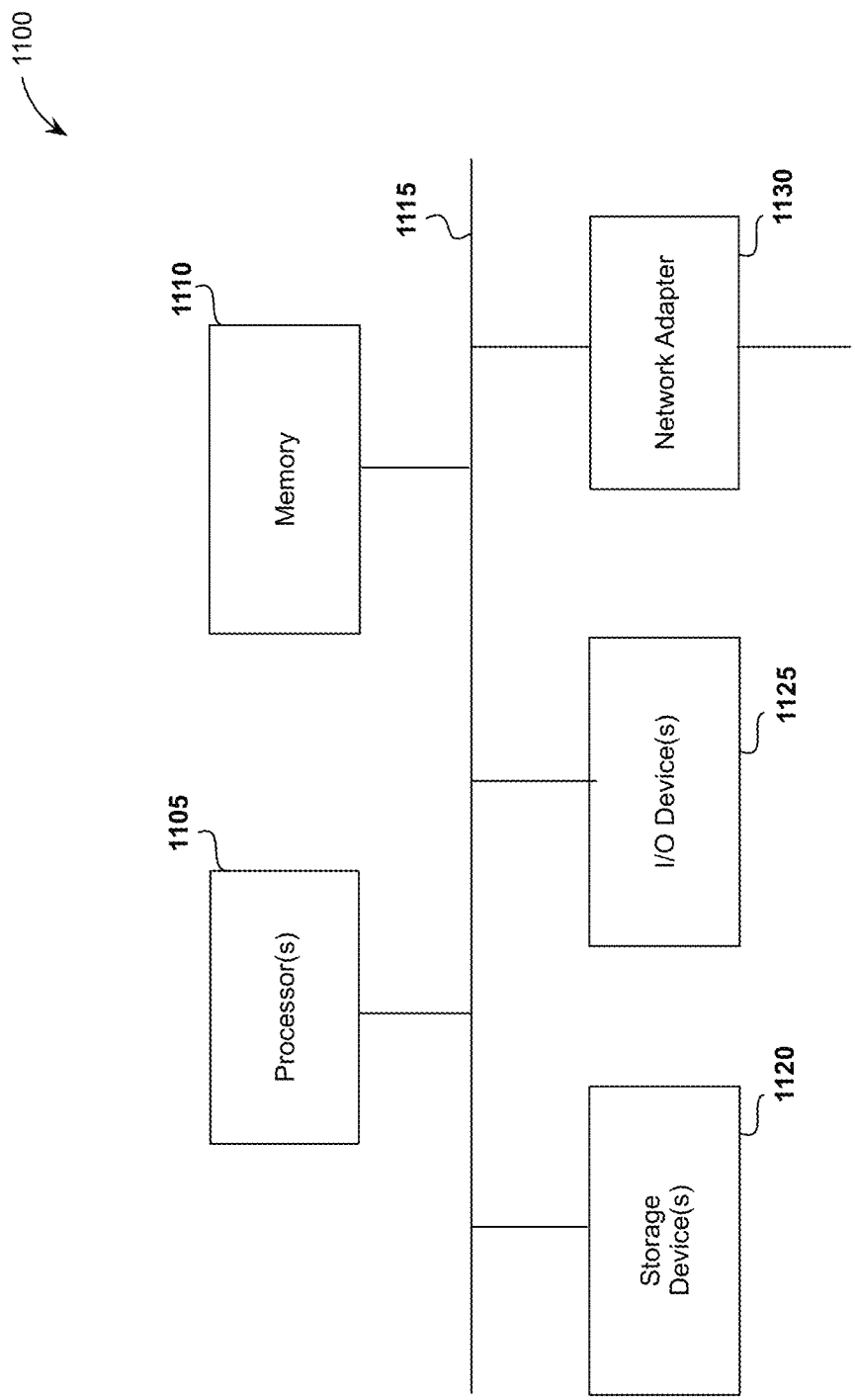
FIG. 12 is a block diagram of a computer system as may be used to implement features of some of the embodiments.

FIG. 12 is a block diagram of a computer system as may be used to implement features of some of the embodiments. The computing system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1110 and storage devices 1120 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 1110 can be implemented as software and/or firmware to program the processor(s) 1105 to carry out actions described above. In some embodiments, such software or firmware may be initially provided to the processing system 1100 by downloading it from a remote system through the computing system 1100 (e.g., via network adapter 1130).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method for improving Cable and Wi-Fi coexistence in a network, comprising:
   determining one or more active Cable operations at a device;
   determining one or more harmonics corresponding to each of the active Cable operations at the device;
   for at least one harmonic of the determined harmonics:
      determining a first measurement of channel quality in a first wireless band;
      detecting the presence of interference in the first wireless band, the interference caused by the at least one harmonic; and
      in response to the detection of the presence of interference caused by the at least one harmonic:
         reducing a backoff interval; or
         increasing a transmission power level;
   wherein the computer-implemented method further comprises any of:
      determining a second measurement of channel quality in the first wireless band following the reducing the backoff interval or following the increasing the transmission power level, and effecting a channel transition from the first wireless band to a second wireless band based on the second measurement of channel quality;
      during a detection period, determining whether energy levels attributable to a Cable operation harmonic exceed a given threshold in a wireless channel, wherein the threshold comprises any of time and energy, to determine if the interference is a consistent phenomenon, wherein transitory interference does not result in a decision to avoid a channel associated with the harmonic;
      effecting a transition of a client from a first component on a wireless device to a second component on the wireless device in response to the interference to establish communications via a component on the wireless device that has least negative affect on the client in view of the interference;
      exchanging packets between an access point and a client, wherein the access point asks the client if the client can switch channels, wherein the client takes into account ongoing traffic when responding to the access point if a switch at this time is acceptable for the client, and wherein the access point takes client feedback into account in making a decision to move the client from a first component on a wireless device to a second component on the wireless device;
      using an extended channel switch announcement element and/or extended channel switch announcement in a beacon and other frames to cover switches between two different bands; or
      an access point performing deep packet inspection to determine a type of traffic, wherein, based on the deep packet inspection results for each client packet, the access point deciding which client to keep on each band and which client to move.

2. The computer-implemented method of claim 1, wherein the detecting the presence of the interference in the first wireless band includes any of:
   determining a duration of the interference in the first wireless band;
   determining an interference power level of the interference in the first wireless band; or
   determining that the interference power level exceeds a threshold.

3. The computer-implemented method of claim 2, wherein the reducing the backoff interval is based on any of the duration of the interference, the interference power level of the interference, or the determination that interference power level exceeds the threshold.

4. The computer-implemented method of claim 2, wherein the increasing the transmission power level is based on any of the duration of the interference, the interference power level of the interference, or the determination that interference power level exceeds the threshold.

5. The computer-implemented method of claim 1, wherein the second wireless band comprises frequencies substantially between 5.725 MHz and 5.875 MHz.

6. The computer-implemented method of claim 1, wherein the determining the one or more harmonics comprises determining that the Cable operation is a Harmonic Related Carrier (HRC) operation associated with causing a fourth harmonic below 2.5 GHz and consequently assessing wireless bands corresponding to at least one of wireless channels 8-14.

7. The computer-implemented method of claim 1, wherein the first wireless band comprises frequencies substantially between 2400 MHz and 2500 MHz.

8. The computer-implemented method of claim 1, wherein the backoff is an EDCA backoff.

9. A non-transitory computer-readable medium comprising instructions configured to cause at least one processor to perform a method comprising:
   determining one or more active Cable operations at a device;
   determining one or more harmonics corresponding to each of the active Cable operations at the device;
   for at least one harmonic of the determined harmonics:
      determining a first measurement of channel quality in a first wireless band;
      detecting the presence of interference in the first wireless band, the interference caused by the at least one harmonic; and
      in response to the detection of the presence of interference caused by the at least one harmonic:
         reducing a backoff interval; or
         increasing a transmission power level;
   wherein the method further comprises any of:
      determining a second measurement of channel quality in the first wireless band following the reducing the backoff interval or following the increasing the transmission power level, and effecting a channel transition from the first wireless band to a second wireless band based on the second measurement of channel quality;
      during a detection period, determining whether energy levels attributable to a Cable operation harmonic exceed a given threshold in a wireless channel, wherein the threshold comprises any of time and energy, to determine if the interference is a consistent phenomenon, wherein transitory interference does not result in a decision to avoid a channel associated with the harmonic;
      effecting a transition of a client from a first component on a wireless device to a second component on the wireless device in response to the interference to establish communications via a component on the wireless device that has least negative affect on the client in view of the interference;

exchanging packets between an access point and a client, wherein the access point asks the client if the client can switch channels, wherein the client takes into account ongoing traffic when responding to the access point if a switch at this time is acceptable for the client, and wherein the access point takes client feedback into account in making a decision to move the client from a first component on a wireless device to a second component on the wireless device;

using an extended channel switch announcement element and/or extended channel switch announcement in a beacon and other frames to cover switches between two different bands; or an access point performing deep packet inspection to determine a type of traffic, wherein, based on the deep packet inspection results for each client packet, the access point deciding which client to keep on each band and which client to move.

10. A computer system comprising:
at least one processor; and
at least one memory comprising instructions configured to cause the at least one processor to perform a method comprising:
determining one or more active Cable operations at a device;
determining one or more harmonics corresponding to each of the active Cable operations at the device;
for at least one harmonic of the determined harmonics:
determining a first measurement of channel quality in a first wireless band;
detecting the presence of interference in the first wireless band, the interference caused by the at least one harmonic; and
in response to the detection of the presence of interference caused by the at least one harmonic:
reducing a backoff interval; or
increasing a transmission power level;
wherein the method further comprises any of:
determining a second measurement of channel quality in the first wireless band following the reducing the backoff interval or following the increasing the transmission power level, and effecting a channel transition from the first wireless band to a second wireless band based on the second measurement of channel quality;
during a detection period, determining whether energy levels attributable to a Cable operation harmonic exceed a given threshold in a wireless channel, wherein the threshold comprises any of time and energy, to determine if the interference is a consistent phenomenon, wherein transitory interference does not result in a decision to avoid a channel associated with the harmonic;
effecting a transition of a client from a first component on a wireless device to a second component on the wireless device in response to the interference to establish communications via a component on the wireless device that has least negative affect on the client in view of the interference;
exchanging packets between an access point and a client, wherein the access point asks the client if the client can switch channels, wherein the client takes into account ongoing traffic when responding to the access point if a switch at this time is acceptable for the client, and wherein the access point takes client feedback into account in making a decision to move the client from a first component on a wireless device to a second component on the wireless device;

using an extended channel switch announcement element and/or extended channel switch announcement in a beacon and other frames to cover switches between two different bands; or an access point performing deep packet inspection to determine a type of traffic, wherein, based on the deep packet inspection results for each client packet, the access point deciding which client to keep on each band and which client to move.

11. The computer system of claim 10, wherein the first wireless band comprises frequencies substantially between 2400 MHz and 2500 MHz.

12. The computer system of claim 10, wherein the determining the one or more harmonics comprises determining that the Cable operation is a Harmonic Related Carrier (HRC) operation associated with causing a fourth harmonic below 2.5 GHz and consequently assessing wireless bands corresponding to at least one of wireless channels 8-14.

13. The computer system of claim 10, wherein the backoff is an EDCA backoff.

14. The computer system of claim 10, wherein the detecting the presence of the interference in the first wireless band includes any of:
determining a duration of the interference in the first wireless band;
determining an interference power level of the interference in the first wireless band; or
determining that the interference power level exceeds a threshold.

15. The computer system of claim 14, wherein the reducing the backoff interval is based on any of the duration of the interference, the interference power level of the interference, or the determination that interference power level exceeds the threshold.

16. The computer system of claim 15, wherein the increasing the transmission power level is based on any of the duration of the interference, the interference power level of the interference, or the determination that interference power level exceeds the threshold.

17. The computer system of claim 10, wherein the second wireless band comprises frequencies substantially between 5.725 MHz and 5.875 MHz.

18. The non-transitory computer-readable medium of claim 9, wherein the determining the one or more harmonics comprises determining that the Cable operation is a Harmonic Related Carrier (HRC) operation associated with causing a fourth harmonic below 2.5 GHz and consequently assessing wireless bands corresponding to at least one of wireless channels 8-14.

19. The computer system of claim 10, further comprising:
when a wireless LAN access point and Cable modem are integrated into the same device, a wireless connection module querying the Cable modem directly to determine the Cable channels that the Cable modem uses for uplink and downlink; and
the wireless connection module taking actions to avoid potential harmonics or to mitigate the effect of the harmonics from the downlink or uplink Cable signal.

20. The computer system of claim 10, further comprising:
when a wireless LAN access point and Cable modem are two separate units, a wireless connection module automatically anticipating harmonic interference.

21. The computer system of claim 10, further comprising:
a connection between a Cable modem and a wireless LAN access point signaling Cable activity using the connection; and
the wireless LAN access point or a router querying a channel of the Cable modem and using information obtained by the query for channel selection.

22. The computer system of claim 10, further comprising:
using counters from a wireless LAN physical layer and MAC layer to measure the severity and influence of interference; and
determining that there is excessive interference when a wireless LAN PHY module misdetects a packet preamble on interference more than a predetermined number of times per second.

23. The computer system of claim 22, further comprising:
indicating that there is interference from the wireless LAN when the MAC layer counter shows that a medium is busy more than a predetermined percent of the time that the wireless LAN is not transmitting or receiving WLAN packets;
wherein duration of the time when there is non-wireless LAN interference which results in backing off is used as a measure of the severity of interference.

24. The computer system of claim 10, further comprising:
a channel switch announcement frame using an action frame for switching between different bands.

25. The computer system of claim 10, further comprising:
an access point deciding to move a client from one band to another band when the access point recognizes that queues are building up for a client, or sees that a delay requirement is not being satisfied for a client.

26. The computer system of claim 10, further comprising:
when all receiver and transmitter mitigation fails to bring up link quality for any access point associated clients, the access point changing a channel of a radio which has a coexistence issue;
upon changing the channel, the access point taking into account coexistence when picking new channels; and
the access point asking other clients for feedback on interference on all channels on the bands upon which the radio operated before the access point issues the channel switch;
wherein interference feedback is used in addition to other statistics that the access point collects to pick the best channel.

27. The computer system of claim 10, further comprising:
within an access point having two radios in the 5 GHz band and at least on radio in the 2.4 GHz band, moving a client from one radio in the 5 GHz band to another radio in the 5 GHz band or moving a client between one radio in the 2.4 G band and the radios in the 5 G band to provide the most effective channels, while taking coexistence into account.

* * * * *